(12) United States Patent
Schwarz et al.

(10) Patent No.: US 7,690,189 B2
(45) Date of Patent: *Apr. 6, 2010

(54) AIRCRAFT COMBINATION ENGINES INLET AIRFLOW CONTROL SYSTEM

(75) Inventors: Frederick M. Schwarz, Glastonbury, CT (US); Brian M. Fentress, Marlborough, CT (US); Andrew P. Berryann, Manchester, CT (US); Jorn A. Glahn, Manchester, CT (US); Charles E. Lents, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 385 days.

This patent is subject to a terminal disclaimer.

(21) Appl. No.: 11/801,270

(22) Filed: May 9, 2007

(65) Prior Publication Data

US 2008/0277533 A1  Nov. 13, 2008

(51) Int. Cl.
*F02K 3/00* (2006.01)
*F02K 7/00* (2006.01)
*F02K 9/00* (2006.01)
*F02K 99/00* (2009.01)

(52) U.S. Cl. .............. 60/224; 60/782; 60/785; 60/226.1; 60/262; 60/225

(58) Field of Classification Search .......... 60/224, 60/225, 782, 785, 226.1, 262
See application file for complete search history.

(56) References Cited

U.S. PATENT DOCUMENTS 7,485,981 B2 * 2/2009 Schwarz et al. ............... 290/52

* cited by examiner

*Primary Examiner*—Michael Cuff
*Assistant Examiner*—Craig Kim
(74) *Attorney, Agent, or Firm*—Kinney & Lange, P.A.

(57) ABSTRACT

A power generation system for propelling, and generating electrical power in, an aircraft, having a gas turbine engine in an engine compartment in the aircraft with an air inlet in the aircraft that is curved along its extent in leading to an air compressor in the gas turbine engine having a compressor air transfer duct extending therefrom to an internal combustion engine provided as an intermittent combustion engine at an air intake thereof. An inlet duct manifold is positioned against the duct wall of the inlet duct to cover a perforated portion thereof on the air compressor side of a curve therein with the inlet duct manifold having an inlet air transfer duct extending therefrom that is coupled to the intermittent combustion engine air intake.

23 Claims, 1 Drawing Sheet

AIRCRAFT COMBINATION ENGINES INLET AIRFLOW CONTROL SYSTEM

CROSS-REFERENCE TO RELATED APPLICATIONS

Referenced herein are U.S. application Ser. No. 11/713,262 filed Mar. 2, 2007 for "COMBINATION ENGINES FOR AIRCRAFT" by Frederick M. Schwarz, Brian M. Fentress, Andrew P. Berryann, Charles E. Lents and Jorn A. Glahn; and U.S. application Ser. No. 11/801,266 filed on even date herewith for "AIRCRAFT COMBINATION ENGINES COMPLEMENTAL CONNECTION AND OPERATION" by Frederick M. Schwarz, Andrew P. Berryann and Brian M. Fentress.

BACKGROUND OF THE INVENTION

The present invention relates to gas turbine engines for aircraft and, more particularly, to gas turbine engines each coupled to a corresponding auxiliary engine.

Gas turbine engines as continuous combustion, open Brayton cycle internal combustion engines have come to dominate as the power plants for larger, faster aircraft to essentially the exclusion of reciprocating engines, or internal, intermittent combustion engines, earlier used as power plants for these kinds of aircraft. This is largely because of the greater power-to-weight ratio of gas turbine engines versus internal combustion engines, especially in large horsepower engines, or, more appropriately, large thrust engines in which those large thrusts are provided with a relatively small, and so smaller drag, frontal area engine structures relative to reciprocating engines. Gas turbine engines generate such large thrusts for propulsion, or horsepower for engines with an output shaft, by combining large volumes of air with large amounts of fuel, and thereby form a jet of large velocity leading to the capability to provide desired speedy flights.

In addition to providing thrust, such gas turbine engines have operated integrated drive generators to generate electricity for the aircraft and for the engine electronic controls. The amount of electricity needed for these purposes in the past has tended to be relatively modest typically in the range of a few hundred kilowatts of electrical power but, with recently arriving new aircraft, exceeding a megawatt of power. However, there are some aircraft, usually for military uses, that have come to have needs for much larger amounts of electrical power either on a relative basis, the electrical power needed relative to the capability of the gas turbine engine available, or on an absolute basis with power needs significantly exceeding a megawatt. Furthermore, such demands for electrical power in military aircraft often occur at relatively high altitudes and often occur unevenly over relatively long time durations of use, that is, large peaks repeatedly occur in electrical power demand in the course of those long use durations.

Corresponding attempts to obtain the added power from the typical aircraft propulsive system, the gas turbine engine, that are needed to operate the concomitant much larger capacity electrical generators, either on a relative or absolute basis, will subtract significantly from the thrust output of the available turbine or turbines. Making up that thrust loss in these circumstances by operating such available turbine engines so as to increase the thrust output thereof causes the already relatively low fuel use efficiency during flight to decrease significantly, which can severely limit the length of otherwise long duration uses, and also brings those engines closer to becoming operationally unstable.

One alternative to using the gas turbine engine as the sole source of power to operate an electrical power generator is to add in the aircraft a further intermittent combustion internal combustion engine, such as gasoline engines operating on the any of the Diesel, Miller, Otto or Wankel cycles. Such engines can operate with a fuel efficiency on the order of seventy percent (70%) better than that of a continuous combustion (Brayton cycle) internal combustion gas turbine engine. At high altitudes, internal combustion engines of all kinds face the problem of limited power output because of the relatively small air pressures there limiting the chemical reactions of oxygen with hydrogen and oxygen with carbon in the burning the engine fuel in the engine combustion chamber or chambers. This can be solved for gas turbine engines by providing therein very large air flows through use, typically, of axial flow compressors usually in two stages with both a low compression compressor followed along the fluid flow path through the engine by a high compression compressor. This arrangement provides at least enough compressed air to the subsequent combustor to sustain the desired combustion process therein and a mass of airflow sufficient to combine with enough fuel to provide the energy needed to overcome the aircraft drag at the speed and altitude intended for operation.

However, such compressors can provide considerably more compressed air than the minimum needed for this purpose thereby allowing some of this compressed air to be delivered through an air transport duct to the air intake of an intermittent combustion internal combustion engine so that, in effect, the compressors of the gas turbine engine serve as a very capable supercharger for that intermittent combustion engine. Thus, this intermittent combustion engine can be operated at the same relatively high altitudes at which the gas turbine engine propelling the aircraft operates while this turbine engine is also supplying compressed air to that intermittent combustion engine. There, depending on the values selected for the peak air intake pressure and engine compression ratio, the intermittent combustion engine can be used as a power source for an electrical power generator that can generate much greater amounts of electrical power than can one powered by a gas turbine engine.

Some kinds of aircraft have the gas turbine engine used therein positioned within walls thereabout of a duct with the inlet side of that duct forming an inlet duct curved to follow a sinuous path to hide the front of that engine from impinging electromagnetic radiation at various wavelengths such as in a stealth type military aircraft (several kinds of which are unmanned aircraft). Typically, much of the inlet duct portion has a cross sectional area more closely approximating an elliptical shape rather than round so that the desired curves in the duct along its extent can be completed over a shorter extent distance, and then the duct cross section changes to being more round at the gas turbine engine location to accommodate that engine. The amount, or sharpness, of the curvature of the inlet portion of the duct, reflected in the curvature of the curve of cross sectional symmetry of that duct along its extent, resulting from the need to achieve the desired hiding of the front of the gas turbine engine depends on the space available for the duct in the aircraft and the size of that engine. That is, the length, L, of the duct curve of cross sectional symmetry from the duct opening to the atmosphere, on one end thereof, to the front of the gas turbine engine on the other end, and the diameter, D, of the front of that engine provide in their ratio L/D a parameter indicative of the curvature of the inlet portion of the duct, and so the compactness of this convoluted duct part and how extreme must be the resulting directional turning of airflows therethrough.

Relatively slow aircraft speeds at which there is little ram effect forcing air into the inlet duct portion such as occur after takeoff of the aircraft from a runway, followed by relatively sharp climb angles with respect to the aircraft flight direction, and the like, lead to separation or separations of the air flows in this inlet duct from the walls of that duct at locations therein just past the relatively sharp curves occurring in this duct in the direction of extent thereof. Regions of such flow separations from the duct walls extending to the gas turbine engine can lead to stalling of the engine fan or cause individual fan blades to flutter and then structurally fail before the aircraft reaches speeds sufficient for the air entering the inlet duct portion to reach such ram pressures as to prevent these separations. Different ratios L/D for the inlet duct portion in aircraft having engines positioned in a duct will lead to different duct path turning angles and turning radii occurring therealong especially at those duct locations just before and past relatively sharp curves in the duct path. Air flow separations locations inwardly just past these curves will be less likely with less duct curvature along the duct path but reducing curvature may also negatively affect the positioning of the gas turbine engine in the aircraft. Thus, such duct curvature may nevertheless be required along with any of the likely air flow separations at these locations having to be tolerated thereby leading to a desire to prevent same.

BRIEF SUMMARY OF THE INVENTION

The present invention provides a power generation system for propelling, and generating electrical power in, an aircraft, having a gas turbine engine in an engine compartment in the aircraft with an air inlet in the aircraft open to the atmosphere and an inlet duct with a duct wall thereabout that is curved along its extent in extending from the air inlet along a curved path leading to an air compressor in the gas turbine engine followed therein by a combustor, the air compressor having a compressor air transfer duct extending therefrom so as to be capable of providing compressed air therein and to the combustor. In addition, there is in the aircraft an internal combustion engine provided as an intermittent combustion engine having an air intake coupled to combustion chambers therein, a rotatable output shaft also coupled to those combustion chambers for generating force, and a fuel system for providing fuel to those combustion chambers, the compressor air transfer duct being connected to the air intake to transfer compressed air thereto. An inlet duct manifold is positioned against the duct wall of the inlet duct to cover a perforated portion thereof on the air compressor side of a curve therein. The inlet duct manifold has an inlet air transfer duct extending therefrom that is coupled to the intermittent combustion engine air intake such that air can be selectively drawn from the inlet duct into the intermittent combustion engine air intake.

DETAILED DESCRIPTION

Figure 1:
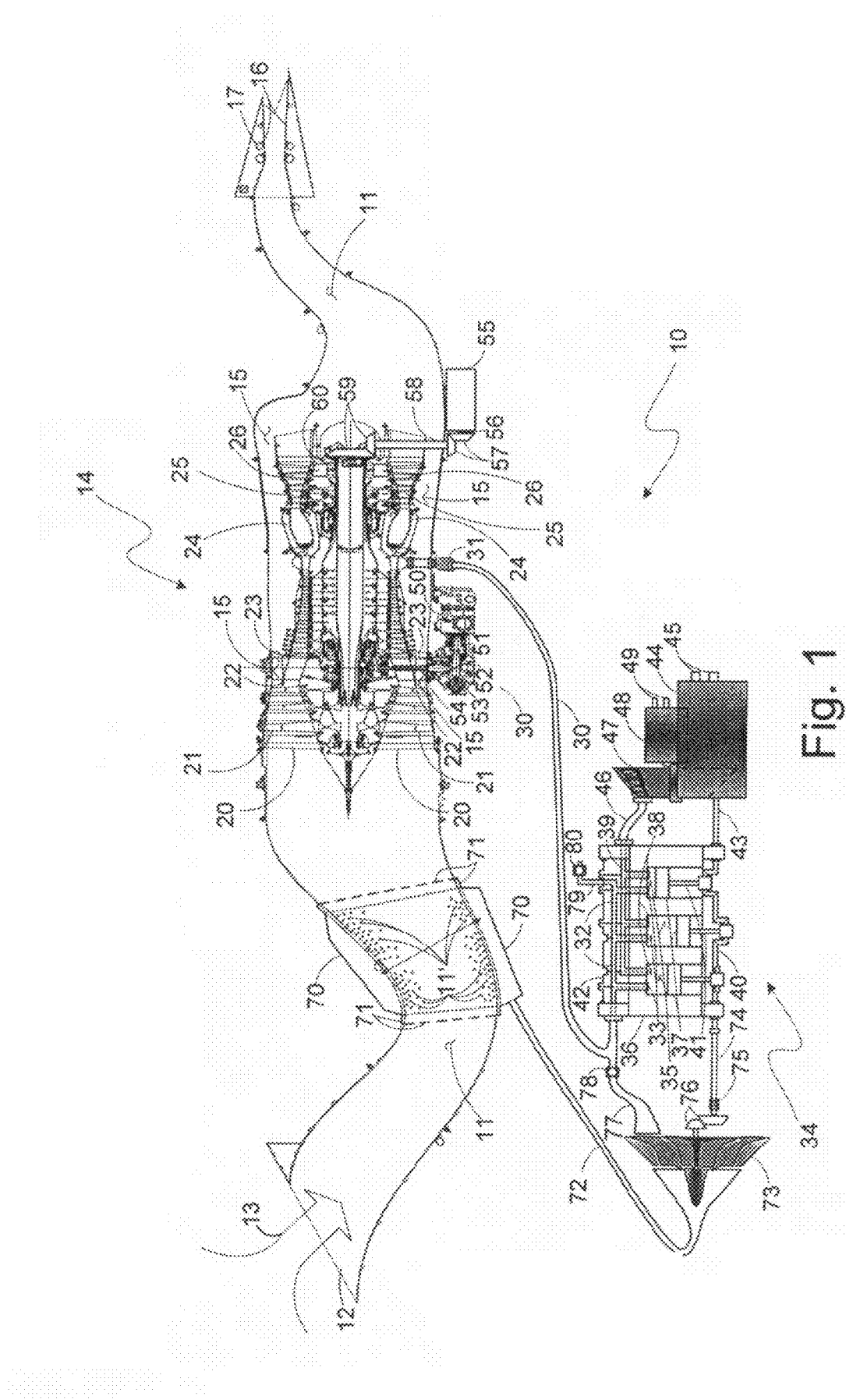
FIG. 1 is a schematic representation of a cross section side view of a portion of an aircraft embodying the present invention.

FIG. 1 shows a schematic representation of a cross section side view of a portion of an aircraft with an example of such a gas turbine engine and intermittent combustion engine combination, 10, in an arrangement in which most of the aircraft structure in which they are positioned has been omitted from this view. However, there is at least a portion of an engine duct, 11, in that aircraft that is shown having openings, or perforations, 11', in a portions of the walls thereof and further having an air inlet, 12, facing forward in the aircraft. The configuration shown for duct 11, with its somewhat sinuous shape, is from a stealth type military aircraft, several kinds of which are unmanned aircraft. This duct first curves downward, coming from the front of the aircraft at the duct opening provided by air inlet 12 to the atmosphere from which an airstream, 13, is drawn. The duct then curves upward to open to a gas turbine engine provided as a turbofan engine, 14, in engine duct 11 which uses airstream 13 for combustion and for fan forced air propulsion purposes. This passageway curvature of duct 11 past air inlet 12 serves to hide the front of engine 14 from impinging electromagnetic radiation at various wavelengths that could be reflected. Perforations 11' are located primarily in the upper and lower portions of the duct wall just past the point of maximum curvature of the duct on the engine 14 side. Outer portions, 15, of duct 11 adjacent engine 14 past a splitter convey the fan forced air provided by engine 14 for propulsion purposes into the remainder of duct 11 past engine 14 toward the outlet of duct 11 to the atmosphere as will be described below.

This fan forced air and the combustion products resulting from combustion in engine 14 are forced out of the remainder of engine duct 11 to an exit nozzle, 16, serving as the outlet of duct 11. A fluid actuation system, 17, provides the force to partial open and close nozzle 16 during the operation of turbofan engine 14. Again, duct 11 past engine 14 first curves downward, coming from that engine, and then the duct curves upward to open to nozzle 16. Here, too, this passageway curvature of duct 11 past engine 14 serves to hide the rear of engine 14 from electromagnetic radiation at various wavelengths impinging at the rear of the aircraft.

Engine 14 has an air inlet guide vane, 20, followed by a high pressure fan, 21, as the fan for the turbofan engine to force air outside and past a splitter, 22, and then through duct portions 15 into the rear of duct 11 and out of that duct through nozzle 16 to exit to the atmosphere. In addition, high pressure fan 21 also serves as a low pressure air compressor through delivering compressed air inside splitter 22 to a high pressure air compressor, 23. The compressed air from high pressure compressor 23 arrives at a combustor, 24, to which fuel is also delivered and burned. The combustion products form a jet of fluid which impinges first on a high pressure turbine, 25, and then on a low pressure turbine, 26, to cause them to rotate which, through appropriate mechanical linkings, leads to high pressure compressor 23 and high pressure fan 21 being forced thereby to also rotate. The combustion products then reach the remainder of duct 11 past engine 14 to exit through nozzle 16 to the atmosphere.

A compressed air conveyance duct, 30, is connected at one end into turbofan engine 14 to receive compressed air from high pressure compressor 23 through a compressed air flow control valve, 31, typically controlled by a system computer (not shown but typically an engine control computer or an aircraft systems computer either eliminating the need for such an engine control computer or operating with it in a distributed control system), and used to control the flow of compressed air from high pressure compressor 23 through duct 30. The opposite end of duct 30 is connected to an air intake, or intake manifold, 32, leading to engine air intake valves, 33, for an intermittent combustion engine, 34, represented in the example of FIG. 2 as a Diesel or Otto cycle engine. Intermittent combustion engine 34 is shown positioned forward in the aircraft of turbofan engine 14 to shift the center of mass of the aircraft forward to counter some of the weight of engine 14 but other positions are possible to be used if desired.

Valves 33 in engine 34 control the air taken into combustion chambers, 35, bounded by an engine block, 36, providing the basic structure of engine 34 and by pistons, 37. Each chamber also has an exhaust valve, 38, through which combustion products are exhausted to an exhaust manifold, 39. A rotatable crankshaft, 40, has a connecting rod, 41, rotatably coupling it to a corresponding one of each of pistons 37. A rotatable camshaft, 42, is used to open and close air intake valves 33 and exhaust valves 38 in a suitable sequence.

Crankshaft 40, under the control of a system controller not shown, is rotated by the force on pistons 37 transmitted thereto by corresponding ones of connecting rods 41 due to repeated combustion events in the corresponding combustion chamber 35 which events occur in all of chambers 35 in a suitable sequence before repeating. These events correspondingly use the air quantities taken through valves 33 repeatedly into, and the fuel quantities repeatedly injected into, those chambers for combustion. The fuel quantities are injected by a fuel injection system not seeable in this figure and the magnitudes thereof are used to select the mechanical power output of crankshaft 40 of the intermittent combustion engine. The resulting combustion products are correspondingly repeatedly rejected from those chambers through valves 38. If an Otto cycle engine is used as intermittent combustion engine 34, the combustion events are initiated by the repeated sparkings of spark plugs not shown in this figure in a suitable sequence across combustion chambers 35 under the control of the system controller. In addition, intermittent combustion engine 34 has a cooling system not shown for cooling the engine structure about combustion chambers 35.

The rotation of crankshaft 40 is suitably fastened to an input shaft, 43, of a primary electrical power generator, 44. The resulting rotation of input shaft 43 electrically energizes output electrical conductors, 45, of generator 44 to thereby generate the desired electrical power thereat for operating aircraft devices (not or not all shown). The demand for electrical power in the aircraft is used as a basis to select the fuel quantities injected in the combustion chambers of the intermittent combustion engine to have that engine supply sufficient mechanical power crankshaft 40 to sufficiently rotate input shaft 43 of generator 44 to meet that demand.

An exhaust duct, 46, extends from exhaust manifold 39 of intermittent combustion engine 34 to an exhaust turbine, 47, to result in the combustion products of engine 34 impinging on the blades of that turbine to thereby cause it to rotate. A central shaft of this exhaust turbine is coupled to an input shaft of a secondary electrical power generator, 48. The resulting rotation of this input shaft electrically energizes output electrical terminals, 49, of generator 48 to thereby generate the further desired electrical power thereat.

Another supplemental electrical power generator is provided in this example by operating an electrical starter (generator), 50, with the electrical motor therein operated also as an electrical generator after the completion of the starting process. Starter (generator) 50 rotates high pressure air compressor 23 to start turbofan engine 14 and, thereafter, with engine 14 operating, this compressor can selectively rotate the rotor in starter (generator) 50 to cause the starter motor to be operated as an electrical power generator.

Starter (generator) 50 has drive (input) shaft, 51, extending from the rotor therein to a set of bevel gears, 52, with the bevel gear on the opposite side of this set rotatably coupled to a clutch, 53. Clutch 53 allows the system computer to engage and disengage starter (generator) 50 as appropriate. The opposite side of clutch 53 has an engagement shaft, 54, extending therefrom ending in bevel gear rotatably engaged with a counterpart bevel gear in a portion of high pressure air compressor 23.

A further supplemental electrical power generator, 55, is shown in FIG. 1 for this example which has an input shaft, 56, extending from the rotor therein to a set of bevel gears, 57, with the bevel gear on the opposite side of this set rotatably coupled to a shaft, 58, which in turn is coupled to a further set of bevel gears, 59. These bevel gears are coupled to an output shaft of low pressure turbine 26 through a clutch, 60. Clutch 60, here too, allows the system computer to engage and disengage generator 55 as appropriate.

During takeoff from a runway of an aircraft containing turbofan engine 14 and intermittent combustion engine 34 and the following climb to gain altitude, intermittent combustion engine 34 is unlikely to be needed to provide torque to electrical generators 44 and 48 for the purpose of their generating large amounts of electrical power while still near that runway. In this portion of the flight, relatively slow aircraft speeds occur leading to the result that air is not forced with substantial pressure into inlet 12 of the inlet portion of duct 11. In this circumstance, often compounded by the relatively sharp climb angles with respect to the aircraft flight direction used after takeoff to gain altitude, separation or separations can occur of the air flows in this inlet duct from the walls of that duct at locations therein just past the relatively sharp curves provided in this duct. Except for possibly being used to start turbofan engine 14, intermittent combustion engine 34 is available in at least this part of the flight to aid in preventing such separations without having to be sized sufficiently to both provide such aid and to provide torque to electrical generators. This engine can do so by establishing a reduced pressure at these locations during this part of the flight by drawing air through perforations 11' located there to help force the duct flows to remain flowing along these portions of the duct walls.

In the distribution of perforations 11' in the walls of the inlet portion of duct 11 for this purpose on the turbofan engine side of the location of the major curve in the path followed by that duct, the greatest densities of those perforations are provided in the walls of the duct at the intersections of duct 11 and a plane projected there through the centerline of that duct. This plane is oriented such that those intersections have the greatest curvature out of those among the various possible intersections. In FIG. 1, those are the portions of duct 11 at the top and bottom thereof on the engine 14 side of the curves in that duct as it is curving along its path in the plane of that figure as this is where flow separations are most likely to occur. The density of perforations 11' diminishes at locations away from the top and bottom locations of maximum perforation densities along peripheral paths over sides of duct 11 between the maximum perforation density locations.

Thus, in FIG. 1, to enable intermittent combustion engine 34 to reduce pressure at the locations of these perforations 11', a partially cut away manifold, 70, is provided shown girdling the input portion of duct 11 so as to be more or less sealed to that duct such that perforations 11' all open from the inside of the duct to the space enclosed by manifold 70 in being sealed to the inlet portion of duct 11. The sealing of manifold 70 to the inlet portion of duct 11 is provided at flanges, 71, extending at the sides of manifold 70 parallel to the outer surface of the duct walls adjacent thereto with a suitable sealing and fastening means. An inlet draw duct, 72, extends at its inlet end from manifold 70 to a flared output end thereof provided adjacent to the fluid drawing side of a blower, 73.

The rotor in blower 73 on which the blower blades are mounted is selectively rotated by intermittent combustion engine 34 through an extension shaft, 74, suitably fastened to crankshaft 40 that engine. Extension shaft 74 is coupled to the blower rotor through a clutch, allowing this rotor to be disengaged from engine 34 under control of the system computer when the blower is not needed, and then through a pair of bevel gears, 76, to increase the rotational speed of the rotor beyond that of crankshaft 40. The air flow through blower 73, either when the rotor thereof is being rotated by engine 34 or not, is received in the flared input end of a coupling duct, 77, in which it is conveyed through a backflow elimination valve, 78, when open to emerge at the output end of duct 77 where it merges with compressed air conveyance duct 30 just ahead of its connection to air intake, or intake manifold, 32 of intermittent combustion engine 34. However, when compressed air from high pressure compressor 23 is selected to be provided through compressed air flow control valve 31 from high pressure compressor 23 through duct 30 to intake manifold 32 of engine 34, valve 78 is closed to prevent that compressed air from being forced through perforations 11' into the inlet portion of duct 11.

The magnitude of the required air flow through perforations 11' from the inlet portion of duct 11 can in some circumstances be as large as 3 to 5% of the total airflow through turbofan engine 14, and this is why blower 73 is provided to supplement the airflow through intake manifold 32 that results from just operating intermittent combustion engine 34 alone. The system computer receives information from appropriate aircraft and engine sensors (not shown) such as the input and output pressure ratio of high pressure compressor 23 or its rotor rotational speed as an indicator of the power being delivered by turbofan engine 14, air temperature, altitude, climbing or descending aircraft angle of attack, or landing gear being down as an indication of an imminent change in the descending angle of attack. From such information, the system computer determines the need for drawing air through perforations 11' from the inlet portion of duct 11 to prevent flow separations from the walls of the inlet portion of that duct past its major curve, and the magnitude thereof needed.

Thus, the system computer can determine that the airflow through intake manifold 32 that results from operating engine intermittent combustion engine 34 alone is sufficient at some operational rotational rate of that engine which the computer selects by controlling the amount of fuel supplied to be injected by the fuel injection system (not shown) for that engine. If the system computer determines that the maximum practical airflow through perforations 11' forced in this manner is insufficient, that computer causes clutch 75 to engage blower 73 to substantially increase that airflow. If the resulting airflow is greater than can be accommodated by the air intake through intake manifold 32, engine air intake valves 33, combustion chambers 35, exhaust valves 38, and exhaust manifold 39, a relief duct, 79, extending from intake manifold 32 conveys the excess through a relief valve, 80, which is caused to be opened by the system computer after determining such a condition exists. This excess airflow is then vented thereby to the atmosphere. Although not shown, the output side of relief valve 80, rather than merely venting the excess airflow to the atmosphere, could be connected by a duct to a variable opening nozzle controlled by the system computer to result in the excess airflow providing additional thrust for the aircraft.

Although the present invention has been described with reference to preferred embodiments, workers skilled in the art will recognize that changes may be made in form and detail without departing from the spirit and scope of the invention.

The invention claimed is:

1. A power generation system for propelling, and generating electrical power in, an aircraft, the system comprising:
a gas turbine engine in an engine compartment in the aircraft with an air inlet in the aircraft open to the atmosphere and an inlet duct with a duct wall thereabout that is curved along its extent in extending from the air inlet along a curved path leading to an air compressor in the gas turbine engine followed therein by a combustor, the air compressor having a compressor air transfer duct extending therefrom so as to be capable of providing compressed air therein and to the combustor;
an internal combustion engine provided as an intermittent combustion engine in the aircraft having an air intake coupled to combustion chambers therein, a rotatable output shaft also coupled to those combustion chambers for generating force, and a fuel system for providing fuel to those combustion chambers, the compressor air transfer duct being connected to the air intake to transfer compressed air thereto, and
an inlet duct manifold positioned adjacent to the duct wall of the inlet duct on the air compressor side of a curve therein so as to permit drawing air therein that has previously entered the inlet duct and with the inlet duct manifold having an inlet air transfer duct extending therefrom that is coupled to the intermittent combustion engine air intake such air can be selectively drawn from the inlet duct into that intermittent combustion engine air intake.

2. The combination of claim 1 further comprising a compressor control valve at least partially in the compressor air transfer duct which can be selectively directed to open more or close more to thereby selectively affect the passage of compressed air through the compressor air duct.

3. The combination of claim 1 further comprising an inlet control valve at least partially in the inlet air transfer duct which can be selectively directed to open more or close more to thereby selectively affect the passage of air through the inlet air duct.

4. The combination of claim 1 further comprising an intake control valve at least partially in the intermittent combustion engine air intake at a location therein such that the air intake couplings to the combustion chambers are between the intake control valve and where the inlet air transfer duct is coupled to the intermittent combustion engine air intake, the intake control valve also being coupled to the to the atmosphere and which can be selectively directed to open more or close more to thereby selectively affect the passage of air through the intermittent combustion engine air intake.

5. The combination of claim 1 further comprising an inlet blower at least partially in the inlet air transfer duct which can be selectively directed to blow more or less air to thereby selectively affect the passage of air through the inlet air duct.

6. The combination of claim 5 wherein a rotor with blades in the blower is mechanically coupled through a coupler to the intermittent combustion engine output shaft.

7. The combination of claim 6 further comprising a speed changing gear set in the coupler.

8. The combination of claim 7 further comprising a clutch as part of the coupler which can be selectively directed to engage or disengage to thereby selectively complete the coupling to cause the blower rotor to be rotated.

9. The combination of claim 5 further comprising an inlet control valve at least partially in the inlet air transfer duct which can be selectively directed to open more or close more to thereby selectively affect the passage of air through the inlet air duct.

10. The combination of claim 1 further comprising a primary electrical generator having a rotatable input shaft mechanically coupled through a coupler to the intermittent combustion engine output shaft and having an output conductor, the output conductor being electrically energized in response to rotation of the input shaft.

11. The combination of claim 10 further comprising the aircraft having selectively operated electrical power consumption devices therein electrically connected or connectable to the output conductor of the primary electrical generator to receive electrical power therefrom.

12. The combination of claim 1 wherein a location on the duct wall portion covered by the inlet duct manifold where a plane passing through the curved path to intersect the duct wall has the intersection with the largest local curvature has a greater density of the perforations than does some other parts of the duct wall located farther from such a plane.

13. The combination of claim 1 wherein the intermittent combustion engine has an exhaust outlet coupled to the combustion chambers therein and further comprises an intermittent combustion engine exhaust turbine positioned at the exhaust outlet and a secondary electrical generator having a rotatable input shaft mechanically coupled through a coupler to an intermittent combustion engine exhaust turbine output shaft, the secondary electrical generator having an output conductor which is electrically energized in response to rotation of the input shaft thereof.

14. The combination of claim 1 further comprising a supplemental electrical generator having a rotatable input shaft coupled through a coupler to the turbine of the gas turbine engine, the supplemental electrical generator having an output conductor which is electrically energized in response to rotation of the input shaft thereof.

15. The combination of claim 14 further comprising a clutch as part of the coupler which can be selectively directed to engage or disengage to thereby selectively complete the coupling to cause the supplemental electrical generator input shaft to be rotated.

16. The combination of claim 1 further comprising an electrical starter having a rotatable operation shaft coupled through a coupler to the air compressor of the gas turbine engine such that the starter can be selectively directed to rotate a rotor in the air compressor or to have a rotor in the starter to be rotated by the air compressor to generate electrical power.

17. The combination of claim 16 further comprising a clutch as part of the coupler which can be selectively directed to engage or disengage to thereby selectively complete the coupling to allow the starter to be selectively directed to rotate a rotor in the air compressor or to allow a rotor in the starter to be rotated by the air compressor.

18. The combination of claim 1 wherein the inlet duct manifold is positioned against the duct wall of the inlet duct so as to cover a space against a portion of that wall so that structural openings extending from the interior of the inlet duct open into that space.

19. The combination of claim 1 wherein the intermittent combustion engine is positioned at least in part forward of the gas turbine engine in an aircraft propelled by the gas turbine engine.

20. The combination of claim 1 wherein the engine combination is in an aircraft propelled by the gas turbine engine that is a turbofan engine.

21. The combination of claim 1 wherein the aircraft is an unmanned stealth type aircraft.

22. A method of generating force and electrical power using an engine combination of a gas turbine engine having an air inlet open to the atmosphere and an inlet duct with a duct wall thereabout that is curved along its extent in extending from the air inlet along a curved path leading to an air compressor followed by a combustor, a turbine and an exhaust exit nozzle open to the atmosphere all positioned along a fluids flow path passing therethrough and of an internal combustion engine provided as an intermittent combustion engine having an air intake coupled to combustion chambers therein, a fuel system coupled to those combustion chambers and a rotatable output shaft also coupled to those combustion chambers, there being a compressor air transfer duct extending from the air compressor to the air intake to transfer compressed air to the air intake from the air compressor, and there being inlet duct manifold positioned against the duct wall of the inlet duct to cover a perforated portion thereof on the air compressor side of a curve therein with the inlet duct manifold having an inlet air transfer duct extending therefrom that is coupled to the intermittent combustion engine air intake such air can be selectively drawn from the inlet duct into that intermittent combustion engine air intake, the method comprising:

operating the gas turbine engine to establish a combustion products flow out the exhaust exit nozzle; and distributing air drawn from the inlet duct to the air intake of the intermittent combustion engine.

23. The method of claim 22 further comprising ending the distributing of air drawn from the inlet duct and thereafter distributing air compressed in the air compressor of the gas turbine engine to the air intake of the intermittent combustion engine.

* * * * *